United States Patent [19]

Loeffelmann

[11] Patent Number: 4,741,803
[45] Date of Patent: May 3, 1988

[54] SPRAY DRYER AND OPERATING METHOD THEREFOR

[75] Inventor: Rudolf Loeffelmann, Langenfeld, Fed. Rep. of Germany

[73] Assignee: Henkel Kommanditgesellschaft auf Aktien, Duesseldorf, Fed. Rep. of Germany

[21] Appl. No.: 814,008

[22] Filed: Dec. 20, 1985

Related U.S. Application Data

[63] Continuation of Ser. No. 571,253, Jan. 16, 1984, abandoned.

[30] Foreign Application Priority Data

Jan. 21, 1983 [DE] Fed. Rep. of Germany ....... 3301872

[51] Int. Cl.$^4$ .......................... B01D 1/18; B01D 1/20
[52] U.S. Cl. .................................. 159/4.04; 159/16.1; 159/48.1; 159/DIG. 2; 203/12; 203/40; 203/90; 202/197; 202/200; 202/236; 55/97
[58] Field of Search ........... 159/4.04, 3, 16.1, DIG. 2, 159/48.1; 202/197, 200, 236; 203/90, 40, 12; 55/302, 96, 97; 34/10, 57 R, 228

[56] References Cited

U.S. PATENT DOCUMENTS

| | | | |
|---|---|---|---|
| 909,460 | 1/1909 | Schrade | 159/4.04 |
| 1,874,665 | 8/1932 | Voorhies | 159/4 F |
| 1,982,920 | 12/1934 | McConnell | 159/4.04 |
| 2,461,584 | 2/1949 | Andersen et al. | 159/4.04 |
| 2,578,315 | 12/1951 | Parker | 159/4.04 |
| 2,842,193 | 7/1958 | Ballestra | 159/4.04 |
| 2,957,519 | 10/1960 | Walker et al. | 159/4.07 |
| 3,472,304 | 10/1969 | Eukin | 159/3 |
| 3,547,179 | 12/1970 | Aussmann | 159/4.04 |
| 3,626,672 | 12/1971 | Burbridge | 159/4.04 |
| 3,629,955 | 12/1971 | Davis | 159/4.04 |
| 3,733,784 | 5/1973 | Anderson et al. | 55/302 |
| 3,735,792 | 5/1973 | Asizawa et al. | 159/4.04 |
| 3,922,189 | 11/1975 | Penders | 159/4.04 |
| 3,926,595 | 12/1975 | Bockman | 55/302 |
| 3,944,650 | 3/1976 | Hirota et al. | 423/242 |
| 3,963,467 | 6/1976 | Rolshau | 55/302 |
| 4,022,595 | 5/1977 | Noland | 55/302 |
| 4,171,243 | 10/1979 | Brooks et al. | 159/4.04 |
| 4,282,348 | 8/1981 | Wada et al. | 159/4.04 |

FOREIGN PATENT DOCUMENTS

| | | | |
|---|---|---|---|
| 0683480 | 3/1964 | Canada | 159/4.04 |
| 1779260 | 9/1971 | Fed. Rep. of Germany | 55/302 |
| 0221598 | 9/1924 | United Kingdom . | |
| 0805114 | 11/1958 | United Kingdom | 159/4.04 |
| 1424863 | 2/1976 | United Kingdom | 55/302 |
| 2003042 | 3/1979 | United Kingdom | 159/4.04 |

Primary Examiner—S. Leon Bashore
Assistant Examiner—V. Manoharan
Attorney, Agent, or Firm—Ernest G. Szoke; Henry E. Millson, Jr.; Mark A. Greenfield

[57] ABSTRACT

A spray dryer consisting of a tower-like drying container with spraying elements for introducing therein the material to be dried, pipelines and heater for injecting a heated drying gas, and a separator for separating dry fine material and gas. The dry fine material is agglomerated inside the drying tower. The separator consists of porous filter tubes, on which a dust-laden gas stream impinges, which covers the entire flow cross-section of the drying tower. Fine product material deposited on the filter tubes is shaken off by surges of compressed air and drops into a drying zone, a spraying zone, and finally, into a collecting hopper.

11 Claims, 2 Drawing Sheets

SPRAY DRYER AND OPERATING METHOD THEREFOR

This application is a continuation of application Ser. No. 571,253, filed Jan. 16, 1984, abandoned.

This invention relates to a spray dryer having a container with a pressure spray element for introducing the material to be dried into the container, means for injecting a heated gas into the container to separate and remove moisture present in the material to be dried, and a separator for separating the moisture-free material from the gas inside the container. The invention also relates to a method of drying materials with the spray dryer of the invention.

BACKGROUND OF THE INVENTION

Spray dryers generally contain a separator, more particularly a cyclone, situated outside the drying container and a fan cooperating therewith. In the separator, the sprayed material being dried is separated from the used gas. The excess pressure or reduced pressure required for operation and the corresponding gas flow are regulated by means of the fan. In all installations of this type, the dust initially leaves the drying container or tower and, thereafter, has to be separately transported or returned to the tower.

In externally arranged separators, particularly cyclones or filters, the cross-section of the pipe for the dust-laden untreated air between the drying container and the separator is gradually reduced by caking dust, necessitating cleaning at correspondingly regular intervals. In addition, separate means for collecting and discharging the dust separated off, in the form of discharge funnels and locks, have to be associated with the external separators. This also increases cleaning and maintenance costs, in addition to which personnel are endangered by the emission of dust during the cleaning and maintenance work.

The externally accumulating dust may also be returned by injection into the spraying zone or, after mixing with water, by introduction into the slurry (wet drying stock). In the first instance, dust accumulates in the spraying zone to such an extent that the temperature and moisture content in that zone fall, so that the dust does not agglomerate as well. The alternative moistening of the dust and its introduction into the slurry necessitates a higher consumption of energy for the additional drying step. Additionally, attempts could be made to add the externally accumulating dust to the dried material. However, this would only increase the percentage of fines in the product and produce an uneven distribution thereof (for example in the form of strands), with the result that the measuring techniques used for determining weight per liter and product moisture (i.e. the crucial quality criteria) would give inaccurate or incorrect results.

German Patent Application No. 17 79 260 describes a spray dryer in which the separator is arranged inside the container or tower of the dryer. In this case, the separator, in the form of a cyclone, is arranged in the middle of the tower, i.e. in the drying zone. Since the volume available for use as a drying chamber is reduced in this way, the installation of a cyclone in the drying zone presupposes corresponding enlargement of the drying tower, besides which a cyclone arranged in the middle of the tower is inaccessible, particularly for cleaning work. Even though, in the spray dryer known from German Application No. 17 79 260 the dust is separated off inside the drying tower, agglomeration is still not possible at this stage. Instead, if it is to be returned, the dust has to be delivered back, for example to the spraying zone, by external means in this instance. Accordingly, the problems associated with spray dryers with respect to dust separators arranged outside the drying tower remain, in addition to which the percentage of fines in the dried product is undesirably increased by the mechanical load applied in the cyclone.

BRIEF DESCRIPTION OF THE DRAWINGS

FIG. 1 shows a cross-sectional schematic view of a drying tower according to the invention.

FIG. 2 shows a cross-sectional schematic view of the novel elements contained in the upper section of the drying tower of the invention.

DESCRIPTION OF THE INVENTION

The present invention provides spray dryer in which the percentage of fines or dust in the dried material can both be separated from the drying gas inside the drying tower and also agglomerated to form product particles characterized by a relatively narrow size distribution. This is accomplished inside the drying tower itself, i.e. without having to pass through external pipes. The operating costs for cleaning, maintenance and energy will therefore be reduced in comparison to costs with separators arranged outside the drying tower.

For spray dryers with a separator arranged inside the drying tower, this is achieved in accordance with the invention by a separator consisting of porous filter elements distributed equally over a surface, wherein the entire flow of the gas laden with the material to be dried within the tower passes through the filter elements.

According to the invention, the sprayed particles of the material to be dried are transported by the stream of drying gas in the spray dryer to the filter elements where they are deposited and partly agglomerated; the filter elements being formed with flexible tubes through which the particle-laden drying gas stream flows in an inward direction. In addition, to dislodge the deposited material, surges of compressed air are applied to the filter elements. The filter elements are preferably made of needlefelt, arranged in groups and/or periodically so that the deposited or agglomerated particles are detached from the filter elements and, in the case of counterflow operation, again fall under gravity through the drying and spraying zones where they are further agglomerated with still moist particles. Instead of the drying air and/or compressed air normally used for operating the dryer, it is also possible, if desired, to use other gases which, depending on their function, are either inert or chemically reactive with respect to the material to be dried.

Through the arrangement of the novel filter elements as a separator inside the drying tower, agglomeration with the powder particles is obtained in the dryer, in addition to which the remaining fines are uniformly distributed throughout the dried material. Accordingly, the crucial, qualitative parameters of the spray dryer, namely the weight per liter and the residual moisture content of the dried product, can be kept within narrow tolerance limits through the control of the process as a whole. Since, in the case of counterflow operation, the agglomerated dust particles dropping off the filter elements fall relatively quickly—in a certain size range—to the tower outlet in counterflow to the gas stream, the particle size distribution obtained is additionally narrowed down around an average value. Whereas the quality of the dried material is reduced by the dust added by conventional spray dryers, the function of the dust added in the spray dryer of the invention is to increase the size of and to agglomerate particles already present, and hence to improve the quality of the dried material.

In contrast to conventional spray dryers, the spray dryer of the invention does not have (a) separate dust separators, (b) an exhaust pipe between the drying tower and the dust separator, (c) locks on the separator for discharging the dust, and (d) transporting means for transporting the dust. Operating costs are thus reduced accordingly. This applies first and foremost to the cleaning of the separator, the locks and the transporting elements for the dust, secondarily to the maintenance of the separator with its insulation and supporting framework, the locks and the transporting means and, finally, to the energy demand. Energy consumption is significantly reduced through lower air resistances (no exhaust pipe), through the absence of a drive for locks and transporting elements and through a more highly integrated system, as compared to conventional spray dryers.

The improvement afforded by the operation of the drying tower of the invention is based above all from the fact that the entire flow cross-section and, more particularly, the tower cross-section of the drying tower is available as the impingement cross-section for the dust-laden air. Accordingly, there is no constriction in the form of an exhaust pipe or the like which, in conventional dryers, leads to an increase in the transport of dust into the separator. By virtue of the uniform distribution of the filter elements according to the invention, a uniform flow profile is obtained over the entire cross-section of the drying tower.

In some cases, however, the flow profile can be made even more uniform, with a given velocity maximum along the axis of the tower, by arranging fewer filter elements in the middle of the head plate. In that instance, less air is extracted from the middle of the tower.

A similar effect is also obtained when the filter tubes are longer in the outer region than at the center. The flow cross-section can be increased or decreased. As explained above, it can also be only partly equipped elements.

DESCRIPTION OF A PREFERRED EMBODIMENT

One embodiment of the invention is described in detail in the following with reference to the accompanying schematic drawings.

Figure 1:
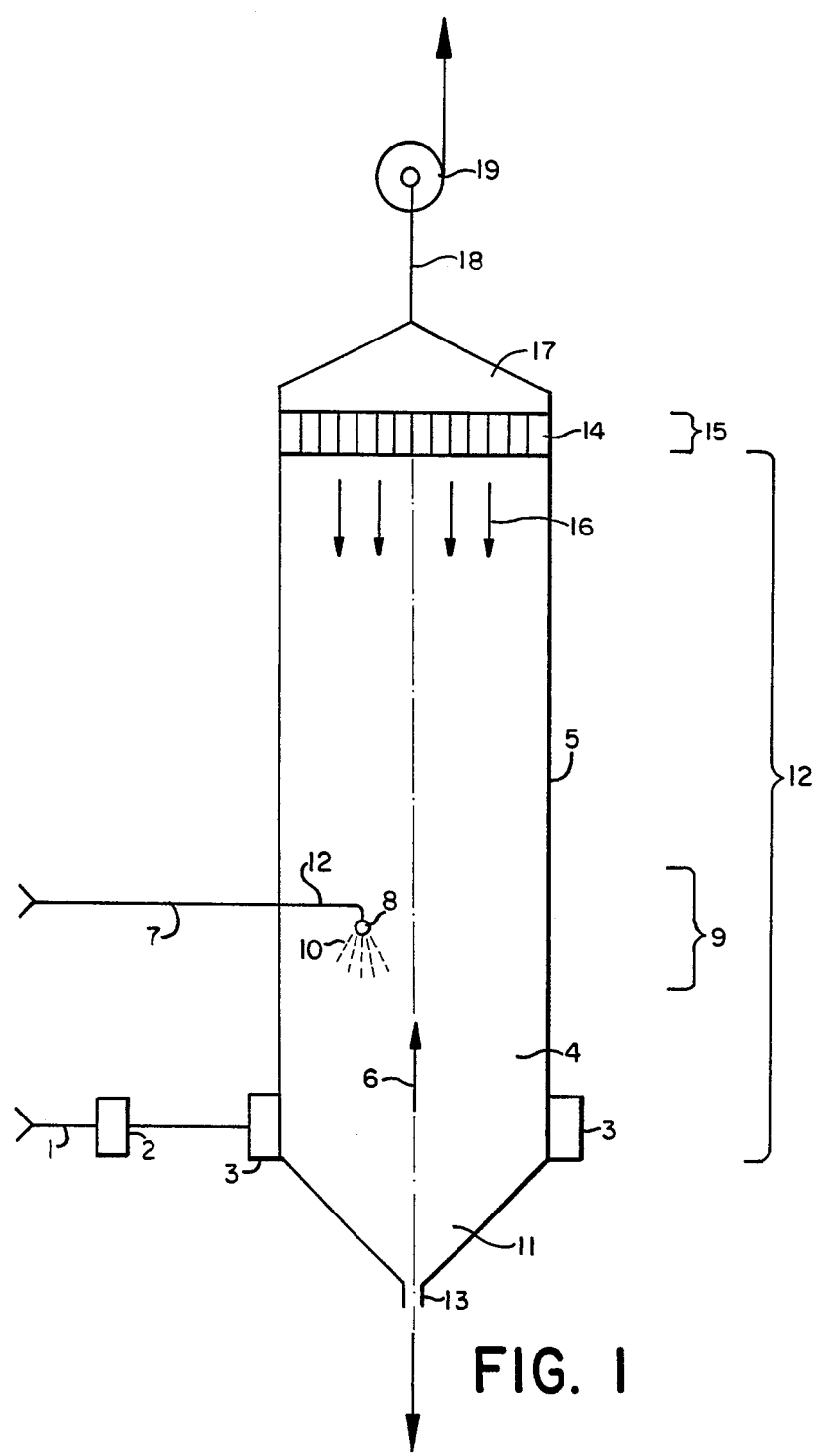

First, with reference to FIG. 1, drying gas introduced through inlet pipe 1 is heated in heater 2 and then flows into ring pipe 3 and from there into the lower end 4 of the drying tower 5. The drying gas, which can be air, smoke gas, or steam, for example, flows upwardly inside drying tower 5 as shown by arrow 6. Simultaneously therewith, moist material in the form of slurry which is to be dried in drying tower 5 is introduced through inlet pipe 7 and sprayed by spray element 8 (or a multiplicity of such spray elements) into spraying zone 9 of drying tower 5. Spray element or elements 8 can be pressure nozzles, multicomponent nozzles, rotating discs or nozzles, or other dispersing devices such as ultrasound devices. The fine dispersion 10 of the slurry to be dried in the drying gas is transported from the region between the collecting hopper 11 at the lower end of drying tower 5 through drying zone 12. In drying zone 12 the mixture of fine dispersion 10 and the drying gas results in the formation of a heterogeneous gas system. The coarser dried particles produced by the drying of fine dispersion 10 fall by gravity into collecting hopper 11 and then through an opening 13 at the base of collecting hopper 11 as dry material. At the same time, the finer lighter particles are transported as dust by the druing gas upward into porous filter elements 14 which are arranged in and extend across the entire upper section 15 of drying tower 5. The agglomerated dust which forms on filter elements 14 is loosened with compressed air (shown and described in FIG. 2) and drops as shown by arrows 16 to collecting hopper 11 where the agglomerated dust is then removed through opening 13. The drying gas that passes through filter elements 14 flow into conical section 17 of drying tower 5, and from there is drawn off through exhaust pipe 18 by means of exhaust fan 19.

Figure 2:
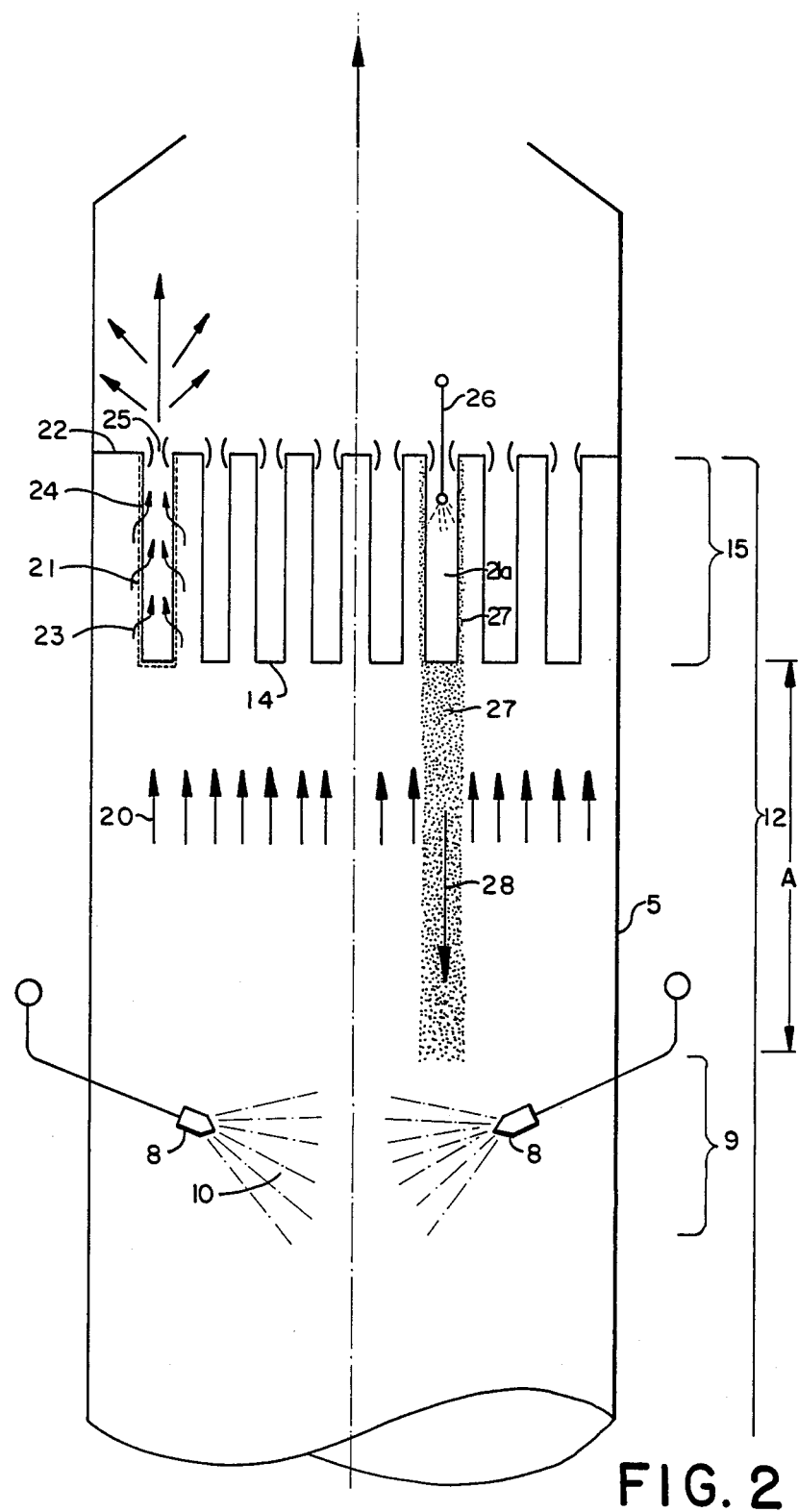

Referring now to FIG. 2, this figure shows additional details of the operation of the novel components of drying tower 5. The direction of flow of the drying gas in drying tower 5 is shown by arrows 20. The flow of drying gas upward is either axially or with a tangential component. The drying gas is charged with the fine dispersion 10 of the slurry to be dried which is discharged into spraying zone 9 through spray elements 8. The fine dispersion 10 is dried to the extent desired in drying zone 12. The coarser dried particles resulting from the drying of the fine dispersion 10 drop downward in drying tower 5, while the finer, powder-form particles are transported by the upward movement of the drying gas to filter elements 14 arranged across upper section 15 of drying tower 5. Filter elements 14 consist of filter tubes 21 extending from a perforated plate 22. The drying gas flowing upward through drying tower 5 in the direction of arrows 20 flows inwardly through filter tube 21 in the direction of small arrows 23 (i.e., filtering flow direction) so that the finer, powder-form particles entrained in the drying gas are deposited on the outer surfaces 24 of filter tubes 21, while the drying gas essentially free of entrained particles flows through the top openings 25 of perforated plate 22. Filter tubes 21 preferably are composed of needlefelt and any type of needlefelt can be employed. Filter tubes 21 and their supports (not shown) are firmly installed so that they cannot touch each other, even under the effect of the forces caused by turbulence of the drying gas. Filter tubes 21 are preferably cleaned in groups and/or periodically by a surge of compressed air (or other inert compressed gas) through compressed air inlet pipe or multiple pipes 26 only one representative of which is shown in the drawings. The compressed air is applied to the insides of filter tube 21. A filter tube 21a in the process of being cleaned in this manner is shown in FIG. 2. During the cleaning phase the partially agglomerated particles 27 are dislodged and fall under the effect of gravity as shown by arrow 28 back into spraying zone 9 where they undergo further agglomeration with moist product particles resulting from partial drying of fine dispersion 10. By periodic cleaning of filter tubes 21 in groups, e.g. 10–20 filter tubes, in the manner described above, a semi-continuous return of agglomerated particles from filter tubes 21 to spraying zone 9 is achieved. In one embodiment of the invention perforated plate 22, which occupied the entire flow cross-section of the tower, was equipped with 1130 filter tubes.

The distance A between the top of spraying zone 9 and the bottom of filter zone 15 was determined by tests to range from about 2.0 meters to about 7 meters, preferably between about 2.5 meters and about 5 meters. In one embodiment the length of filter tubes 21, i.e. the length of filter zone 15, was 2.7 meters.

As desribed above, the concept of the spray dryer of the invention applies both to counterflow operation and also to parallel flow operation. With parallel flow operation, however, the dust filtered off does not pass through the spraying zone. Instead, the filter tubes are arranged at regular intervals in an annular extraction duct (not shown). If a spray dryer is to be converted from parallel flow to counterflow operation, the filter tubes 21 shown in FIGS. 1 and 2 would have to be removed. In that instance, one advantage of the invention would lie in the fact that a uniform air flow would be obtained in parallel flow operation by virtue of the perforated plate 22 remaining in the drying tower 5.

What is claimed is:

1. A vertical spray dryer for obtaining particulate solid products by removing water from products having water associated therewith comprising
   (a) at least one spray element for introducing the product to be dried into the spray dryer to define a spraying zone;
   (b) means for introducing a heated drying gas into the lower end of the spray dryer to establish a flow of the heated drying gas upward through said spraying zone;
   (c) a separator defining a filter zone, positioned across the entire upper section of the spray drier, wherein the distance between the bottom of the filter zone and the top of the spraying zone is about 2 to 7 meters, and wherein the separator contains porous filter elements in the form of tubes closed at the bottom end positioned so that the entire flow of the drying gas passes through the porous filter elements to impinge against entrained product particles from the drying gas and thereby dislodge them;
   (d) means for introducing a flow of compressed gas against the porous filter elements to loosen product particles adhering thereto; said means being positioned so that the flow of said compressed air is outward through the porous filter elements and is in a reverse direction to that of the drying gas;
   (e) means for exhausting said drying gas at the top of said tower; and
   (f) means for removing formed particulate solids at the bottom of the tower.

2. A spray dryer in accordance with claim 1 wherein the porous filter elements are composed of needlefelt.

3. A spray dryer in accordance with claim 1 wherein the porous filter elements are suspended from a perforated plate.

4. A spray dryer in accordance with claim 1 wherein said distance between the bottom of the separator (c) and the top of the spray element (a) is in the range of from about 2.5 meters to about 5 meters.

5. A method for removing water from a product having water associated therewith comprising the steps of
   (i) spraying the product having water associated therewith into the spraying zone of the vertical spray dryer;
   (ii) simultaneously introducing a heated drying gas into a lower section of the spray dryer so that said drying gas travels upward from below said sprayed product to contact the sprayed product and agglomerate particulate solids while entraining fine particles therein, said agglomerated solids falling to the bottom of said tower under force of gravity;
   (iii) passing the drying gas containing the entrained fine particles upward through porous filter elements contained within an upper section of the spray dryer to filter out the entrained fine particles and form agglomerates thereof on the surface of the porous filter elements; and
   (iv) intermittently passing a flow of compressed gas through the porous filter elements in a direction opposite to that of the drying gas to dislodge the fine particle agglomerates therefrom, wherein those fine particle agglomerates of sufficient weight to overcome the upward pressure of said heated drying gas fall to the bottom of said tower under force of gravity.

6. A method in accordance with claim 5 wherein the drying gas is air.

7. A method in accordance with claim 5 wherein in (iv) the compressed gas is air.

8. A process in accordance with claim 5 wherein the product having water associated therewith in step (i) is in the form of a slurry.

9. A spray dryer for obtaining particulate solids from an aqueous slurry, comprising:
   a vertical tower having an upper section surmounted by a top section, a drying zone below said upper section, and a bottom section below said drying zone;
   means for introducing said slurry into said tower above the lower end of said drying zone;
   means for spraying said introduced slurry into a fine disperison, thus defining a spraying zone within said drying zone;
   means for drying said sprayed slurry to form particulate solids and dust, comprising a conduit for introducing upwardly flowing heated drying gas into said tower at the bottom of said drying zone, so that said particulate solids fall under force of gravity to the bottom section of said tower and said dust is entrained by said drying gas;
   means for exhausting all of said introduced gas from said tower, located in the top section thereof;
   means located in said upper section, for collecting said entrained dust;
   menas for dislodging agglomerated dust particulate solids from said collecting means so that they fall under force of gravity to the bottom section of said tower; and
   means for removing all particulate solids collected in the bottom section of said tower.

10. The dryer of claim 9 wherein said means for collecting said entrained dust comprises;
    a horizontal plate having a plurality of circular perforations, which is mounted at the upper part of said upper section and which conforms to the inner surface of said tower;
    a plurality of tubular filter elements equal to the number of perforations, each open at one end, and each conforming to and attached to one of said perforations, said filter elements projecting downward from said plate, and each comprising a filter material whose pores are sized to collect and agglomerate said entrained dust.

11. The dryer of claim 10 wherein said means for dislodging said agglomerated dust comprises a plurality of remover elements, each said remover element comprising an inlet pipe for insertion into one said tubular filter element through its open end, each said remover element being connected to compressed gas supply means at its upper end and having means for discharging said compressed gas against the inner walls of said filter elements at its lower end.

* * * * *